United States Patent [19]
George et al.

[11] Patent Number: 6,115,085
[45] Date of Patent: Sep. 5, 2000

[54] FOCUS VOLTAGE TRACKING CIRCUIT

[75] Inventors: John Barrett George, Carmel; Dal Frank Griepentrog, Indianapolis, both of Ind.

[73] Assignee: Thomson Licensing S.A., Boulogne Cedex, France

[21] Appl. No.: 09/100,805

[22] Filed: Jun. 19, 1998

[51] Int. Cl.[7] .............................. H04N 3/22; H01G 29/58
[52] U.S. Cl. ............................................ 348/806; 315/382
[58] Field of Search .................................... 348/806, 807, 348/805, 380, 377, 379; 315/382, 382.1; H04N 3/22, 3/26

[56] References Cited

U.S. PATENT DOCUMENTS

| | | | |
|---|---|---|---|
| 3,818,305 | 6/1974 | Dumas | 321/2 |
| 4,214,188 | 7/1980 | Bafaro et al. | 315/382 |
| 4,230,972 | 10/1980 | Bafaro | 315/382 |
| 4,825,129 | 4/1989 | Nero | 315/278 |
| 5,430,358 | 7/1995 | George | 315/382 |
| 5,486,741 | 1/1996 | George | 315/382 |
| 5,565,746 | 10/1996 | George | 315/382 |

FOREIGN PATENT DOCUMENTS

| | | | |
|---|---|---|---|
| 0651564 | 5/1995 | European Pat. Off. | H04N 3/26 |
| 4039838 | 7/1991 | Germany | H04N 3/26 |
| 19529136 | 4/1996 | Germany | H04N 3/26 |
| 4-48876 | of 0000 | Japan . | |
| 54-14118 | 1/1979 | Japan | H04N 9/28 |

OTHER PUBLICATIONS

*Nokia Service Manual for Chassis 445M/X*, 21Δ Colour Monitor, Salo, Finland, ZB1532, 11.93, cover pg., Figure 3 High Voltage Supply SMM046, Section 3. High Voltage Supply, 3 pgs.
*US 5,705,900 issued Jan. 6, 1998 corresponds to DE 195 29 136 **UK 2 239 148 corresponds.
Copy of German Search Report.

*Primary Examiner*—Michael H. Lee
*Attorney, Agent, or Firm*—Joseph S. Tripoli; Joseph J. Laks; Sammy S. Henig

[57] ABSTRACT

A direct current focus voltage applied to a focus electrode of a cathode ray tube that produces a blue image is set to slightly defocus the blue image for increasing the blue beam spot size. The increase in the blue beam spot reduces the saturation and allows brighter blue and increased blue video drive range. A passive network is coupled between an ultor electrode and the focus electrode to provide tracking of focus voltage-to-ultor voltage ratio. The tracking prevents voltage fluctuation of the ultor voltage produced by video loading from disturbing uniform defocussing in the entire blue image.

12 Claims, 1 Drawing Sheet

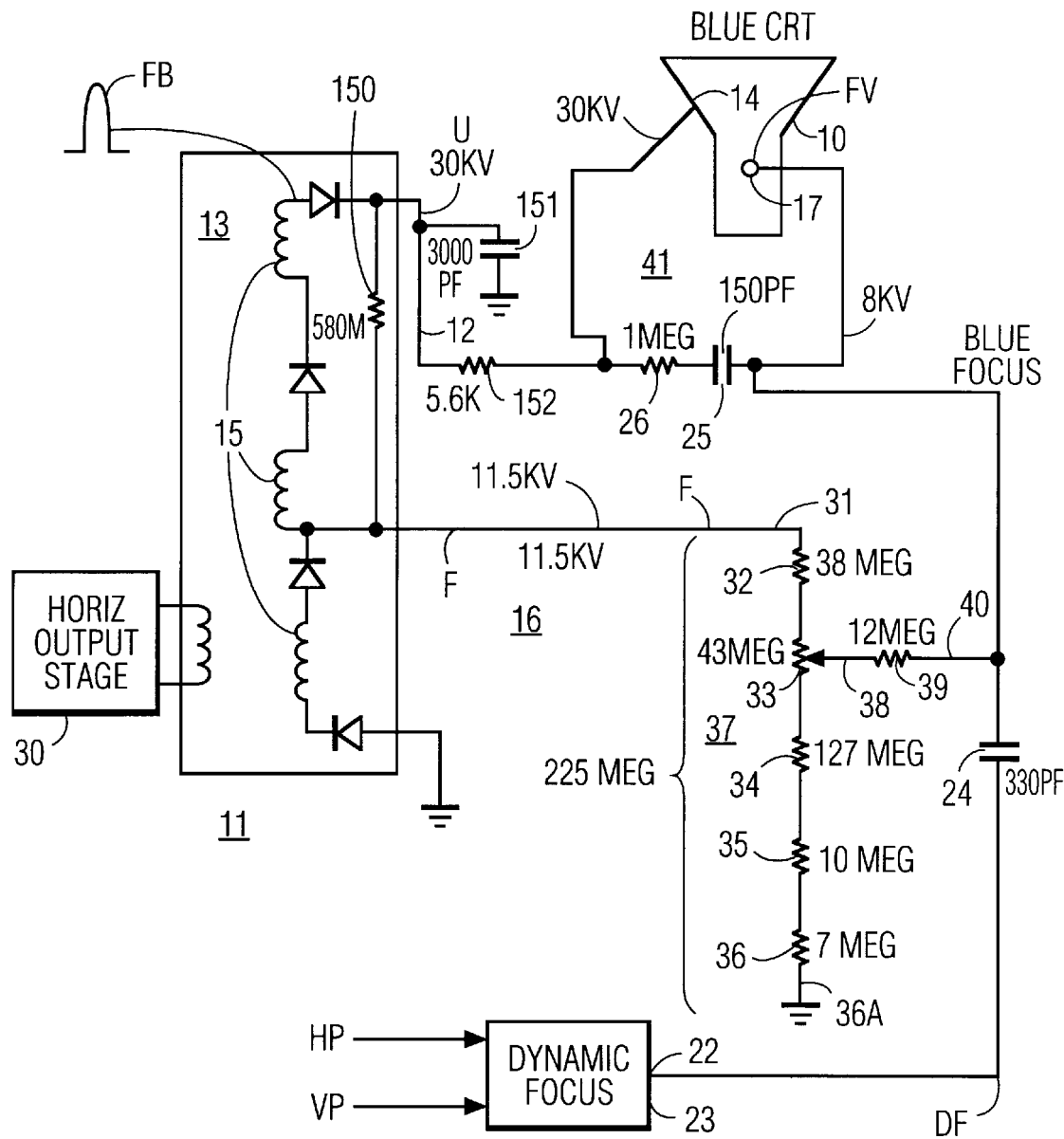
FIGURE

FOCUS VOLTAGE TRACKING CIRCUIT

BACKGROUND OF THE INVENTION

An image displayed on a cathode ray tube (CRT) may suffer from imperfections or distortions such as defocusing or nonlinearity that is incident to the scanning of the beam on the CRT. Such imperfections or distortions occur because the distance from the electron gun of the CRT to the faceplate varies markedly as the beam is deflected, for example, in the horizontal direction. Typically, reducing the defocusing that occurs as the beam is deflected in the horizontal direction may be obtained by developing a dynamic focus voltage having a parabolic voltage component at the horizontal rate and applying the dynamic focus voltage to a focus electrode of the CRT for dynamically varying the focus voltage.

In projection television receiver (PTV), the blue phosphor of the screen of the CRT has a significantly lower persistency than the green or red phosphor. To compensate for the persistency difference, the instantaneous brightness of the blue phosphor is made significantly higher than that of the green or red phosphor. Because of the higher instantaneous brightness, the blue phosphor saturates at high video drive levels. Thus, light output does not increase in blue as video drive increases. In contrast, light output in the red and green phosphors continues to increase as video drive increases. The result is yellow in high light areas formed on the screen.

Obtaining high brightness of the picture for a given CRT may be desirable. Therefore, blue focus is typically set to be slightly defocussed for increasing the blue beam spot size. The increase in the beam spot size increases the saturation threshold and allows brighter blue and increased linear blue drive range. Slight blue defocusing is acceptable. This is so because the human eye cannot focus on blue and red at the same time and most picture detail is conveyed in red and green.

Beam current changes resulting from video loading cause variations of the ultor voltage. Despite having blue defocused in most areas of the picture, in some areas of the picture focussing may remain optimal, when the focus voltage does not track the ultor voltage.

It may be desirable to maintain consistent defocussing over the entire picture. Therefore, it may be desirable to make the focus voltage track changes in ultor voltage by maintaining a constant ratio of focus voltage to ultor voltage of, for example, ⅓. If this ratio tracking requirement is not met everywhere in the picture, there will be portions of the picture where the ultor voltage changes with respect to the blue focus voltage will cause undesirable ideal blue focussing. This will cause blue phosphor saturation and a lack of desired blue brightness may occur. The areas affected will appear as undesirable yellow horizontal stripes in white areas.

It may be desirable to provide correct focus voltage-to-ultor voltage ratio tracking so that the blue picture can be uniformly defocused for obtaining increased brightness with minimum yellow in the white areas.

In one prior art, focus voltage-to-ultor voltage ratio tracking was obtained by applying a portion of the ultor voltage to an input terminal of a dynamic focus amplifier such that a sample of the ultor voltage is summed in the amplifier with dynamic focus signals. A composite signal developed at an output terminal of the amplifier is then coupled to the focus electrode of each CRT of the PTV receiver through dynamic focus coupling capacitors

SUMMARY

In a video imaging apparatus, embodying an aspect of the invention, a cathode-ray tube includes an ultor electrode and a focus electrode. A high voltage power supply is used for generating a high voltage ultor voltage at the ultor electrode and a high voltage focus voltage at the focus electrode. A passive network has a first terminal at which the ultor voltage is developed and a second terminal at which the focus voltage is developed. The passive network includes a first capacitance for capacitively coupling a voltage fluctuation component of the ultor voltage to the focus electrode.

BRIEF DESCRIPTION OF THE DRAWING

In the Drawings:

The sole FIGURE illustrates a dynamic focus generator, embodying an inventive feature for a CRT.

DESCRIPTION OF THE PREFERRED EMBODIMENTS

The sole FIGURE illustrates a CRT 10 of a projection television receiver (PTV). CRT 10 produces a blue image and has an ultor electrode 14 coupled via a protection resistor 152 to an ultor voltage supply terminal 12 of a conventional high voltage power supply 11. The other two CRT's of the PTV are not shown. Power supply 11 includes a flyback transformer 13 coupled to a conventional horizontal deflection circuit output stage 30. Transformer 13 has a segmented high voltage winding 15. An ultor voltage U developed at terminal 12, of approximately 30 KV direct current (DC) voltage, is developed from a flyback pulse voltage FB that is rectified. An ultor filter capacitor 151 is coupled to terminal 12. Capacitors 151 and resistor 152 may be included in a module, not shown, that distributes voltage U to each of the three CRT's of the PTV. Pulse voltage FB is developed from the sum of the flyback pulse voltages of all the segments of winding 15.

A focus voltage generator 16 includes approximately one-third of the winding turns of winding 15. Generator 16 produces a high voltage F of approximately 11.5 KV DC from the portion of pulse voltage FB developed in one-third of the winding turns of winding 15. Voltage F is developed at a terminal 31 of a resistive voltage divider 37 having a very high resistance. A bleeder resistor 150 is coupled between the terminals where voltages U and F are developed. Voltage divider 37 includes a resistor 32, a potentiometer resistor 33, a resistor 34, a resistor 35 and a resistor 36, coupled in series in that order. Terminal 31 forms an end terminal of resistor 32. An end terminal 36a of resistor 36 is coupled to a reference voltage, referred to as ground.

A DC voltage component of a focus voltage FV is developed from voltage F at a terminal 38 of potentiometer resistor 33. The DC voltage component of voltage FV is coupled to a focus electrode 17 of CRT 10 via a resistor 39. The DC voltage component of focus voltage FV is adjustable over a voltage range of about 1.5 KV to facilitate focus voltage adjustment.

A dynamic focus correction signal DF is developed at an output terminal 22 of a conventional dynamic focus signal generator 23. An example of generator 23 is described in U.S. Pat. No. 5,430,358 entitled "High Voltage Vertical Dynamic Focus Amplifier in the name of John B. George. Generator 23 may include an amplifier stage, not shown. Generator 23 receives a horizontal rate parabola signal HP and a vertical rate parabola signal VP and combines the parabola signals. Signal DF includes a sum of an 800 V p—p horizontal rate parabola component signal and a 300 V p—p vertical rate parabola component signal at a fundamental frequency of, for example, 60 Hz. Signal DF is coupled via a capacitor 24 to focus electrode 17 of CRT 10.

The capacitance value of capacitor 24 is chosen so that in combination with resistance developed at a junction terminal 40 of resistor 39 and capacitor 24, there is insignificant signal attenuation and minimal phase shift at the 60 Hz rate of the vertical rate parabola component signal. However, such arrangement forms a low pass filter that prevents voltage fluctuations produced in voltages U and F, as a result of video loading, from occurring in focus voltage FV. The above mentioned low pass filtering provides a side benefit in that a distortion inherent by using the one-third portion of winding 15 is eliminated.

In accordance with an inventive feature, a 150 pF capacitor 25, coupled in series with a 1 Meg ohm resistor 26, form together a series resistor-capacitor (R-C) network 41 that is coupled between ultor voltage terminal 12 and focus electrode 17. Advantageously, R-C network 41 is applied only to the focus electrode of the CRT 10, that produces the blue image. The focus voltage generators, not shown, of the CRTs that produce the green and red images, not shown, are similar to focus voltage generator 16 except that they do not include a network such as to network 41.

Dynamic focus signal DF of generator 23 is capacitively voltage divided across by a capacitive voltage divider formed by capacitors 24 and 25. Signal components of signal DF at low frequencies in the range 60 Hz to 1 KHz are attenuated at the focus electrode 17 to about ⅔ of their values.

The voltage fluctuations in the frequency range from 60 Hz to 1 KHz of ultor voltage U caused by video loading are voltage divided down in the voltage divider consisting of resistor 26 capacitor 25 and capacitor 24 by a division ratio of ⅓. As a result, ⅓ of the amplitude of the voltage fluctuations of ultor voltage U is applied to blue focus electrode 17 for providing optimum tracking of focus voltage FV with respect to voltage U.

As explained before, if the tracking requirement were not met everywhere in the picture, there could be portions of the picture where, because of the ultor voltage changes, blue focus voltage FV could cause undesirable ideal focussing. The result is that phosphor saturation and a lack of desired blue brightness may occur.

For signal components of signal DF at frequencies above 1 KHz, 1 Meg resistor 26 becomes dominant and large with respect to the reactance of capacitors 25 and 24 and stops the dividing action. Therefore, advantageously, for a horizontal rate dynamic focus signal component at 15 KHz there is negligible attenuation. The video signal induced voltage fluctuations become smaller for these frequencies and may not require voltage fluctuation tracking of voltage FV with respect to voltage U. During picture tube arc over, supply terminal 12 is temporarily and quickly grounded. Advantageously, 1 Meg resistor 26 protects dynamic focus signal generator 23 from damage due to large currents that would flow in capacitors 24 and 25 if resistor 26 were absent.

What is claimed is:

1. A video imaging apparatus, comprising:
a cathode-ray tube including an ultor electrode and a focus electrode;
a high voltage power supply for generating a high voltage ultor voltage at said ultor electrode and a high voltage focus voltage at said focus electrode;
a first reactive impedance having a first terminal at which said ultor voltage is developed and a second terminal at which said focus voltage is developed, said first reactive impedance coupling a voltage fluctuation component of said ultor voltage to said focus electrode; and
a second reactive impedance coupled to said focus electrode to form with said first reactive impedance a reactive voltage divider with respect to said voltage fluctuation component.

2. A video imaging apparatus according to claim 1 wherein said voltage fluctuation component of said ultor voltage is produced by video loading.

3. A video imaging apparatus according to claim 1 further comprising, a dynamic focus voltage generator for generating a dynamic focus voltage component of said focus voltage and a second capacitor for coupling said dynamic focus voltage component to said focus electrode.

4. A video imaging apparatus according to claim 3 wherein said first and second capacitors form a capacitive voltage divider with respect to one of said dynamic focus voltage component and said voltage fluctuation component.

5. A video imaging apparatus according to claim 4 wherein said second capacitor forms with said first capacitor said capacitive voltage divider with respect to each one of said dynamic focus voltage component and said voltage fluctuation component.

6. A video imaging apparatus according to claim 4 wherein said dynamic focus voltage component includes a first parabolic dynamic focus voltage portion at a frequency that is related to a horizontal deflection frequency and a second parabolic dynamic focus voltage portion at a frequency that is related to a vertical deflection frequency and wherein said capacitive voltage divider attenuates said second parabolic dynamic focus voltage portion.

7. A video imaging apparatus according to claim 6 further comprises, a resistor coupled in series with said first capacitor for preventing said capacitive voltage divider from attenuating said first parabolic dynamic focus voltage portion.

8. A video imaging apparatus according to claim 1 wherein said first reactive impedance couples without amplifying.

9. a video image apparatus according to claim 1 wherein said reactive voltage divider provides voltage attenuation for developing at said focus electrode a portion of said voltage fluctuation component.

10. A video imaging apparatus, comprising:
a cathode-ray tube including an ultor electrode and a focus electrode;
a high voltage power supply for generating a high voltage ultor voltage at said ultor electrode and a high voltage focus voltage at said focus electrode;
a first reactive impedance for coupling a voltage fluctuation component of said ultor voltage to said focus electrode;
a dynamic focus voltage generator for generating a dynamic focus voltage component of said focus voltage; and
a second reactive impedance for coupling said dynamic focus voltage component to said focus electrode such that said first and second reactive impedances form a reactive voltage divider with respect to one of said dynamic focus voltage component and said voltage fluctuation component of said ultor voltage.

11. A video imaging apparatus according to claim 1 wherein said first reactive impedance comprises a first capacitance for capacitively coupling said voltage fluctuation component to said focus electrode.

12. A video imaging apparatus according to claim 10 wherein said first and second reactive impedances comprise a first capacitance and a second capacitance, respectively, that form a capacitive voltage divider.

* * * * *